(12) United States Patent
Walsh

(10) Patent No.: US 7,946,301 B1
(45) Date of Patent: May 24, 2011

(54) LASER POWERED AUTOMOBILE WINDOW CLEANING SYSTEM AND METHOD

(76) Inventor: John Walsh, East Sandwich, MA (US)

( * ) Notice: Subject to any disclaimer, the term of this patent is extended or adjusted under 35 U.S.C. 154(b) by 672 days.

(21) Appl. No.: 12/001,615

(22) Filed: Dec. 12, 2007

(51) Int. Cl.
*B08B 1/00* (2006.01)
(52) U.S. Cl. ............... 134/123; 134/122 R; 134/201
(58) Field of Classification Search .......... None
See application file for complete search history.

(56) References Cited

U.S. PATENT DOCUMENTS

| | | | |
|---|---|---|---|
| 4,720,621 A | 1/1988 | Langen | 219/121 L |
| 5,151,134 A | 9/1992 | Boquillon et al. | 164/1 |
| 6,114,651 A | 9/2000 | Schluter et al. | 219/121.69 |
| 2003/0147159 A1* | 8/2003 | Dube et al. | 359/833 |
| 2006/0144834 A1* | 7/2006 | Denney et al. | 219/121.84 |

FOREIGN PATENT DOCUMENTS

| | | |
|---|---|---|
| JP | 2000-202384 | 7/2000 |
| JP | 2000-202385 | 7/2000 |
| JP | 2001-009399 | 1/2001 |
| JP | 2001-300749 | 10/2001 |
| JP | 2002-177613 | 6/2002 |
| WO | WO 83/01400 | 4/1983 |
| WO | WO 2005/058514 | 6/2005 |

* cited by examiner

*Primary Examiner* — Michael Kornakov
*Assistant Examiner* — Ryan Coleman
(74) *Attorney, Agent, or Firm* — Janine D. Geraigery; Law Offices of J.D. Geraigery

(57) ABSTRACT

A laser powered cleaning system for cleaning pollutants and debris from both sides of automobile windshields and windows. The system includes an electromagnetic interior block having a top surface having a plurality of focused laser beams, and a magnetic exterior block having a top surface including a reflective surface. The windshield or window is situated between the interior and exterior blocks which pass over the window for cleaning. A power cord connected to an adapter plugs into an automobile power outlet for supplying power. A safety sensor is integrally coupled to the interior block for actuating the system when safe. The system is fixable onto a windshield or window within a door of an automobile. An on-off switch actuates the fixed system.

5 Claims, 7 Drawing Sheets

LASER POWERED AUTOMOBILE WINDOW CLEANING SYSTEM AND METHOD

BACKGROUND OF THE INVENTION

1. Field of the Invention

The invention relates to cleaning devices, and more particularly, to a laser powered cleaning system and method of same for cleaning pollutants from automobile windows.

2. Description of the Related Art

Since the automobile was invented, drivers have consistently struggled to keep their windows free of pollutants and debris. Windshield wipers significantly helped drivers during the rain, while snow scrapers were utilized to remove snow. Not that many years ago, drivers had their gas pumped for them, and during this time, the gas attendants would commonly wash off the front and back windshields. Now that drivers are pumping their own gas, there is no longer a convenient way to clean windshields and windows without getting a car wash. In addition, defrost mechanisms in cars, as well as pollutants in the air often smudge and dirty the inside of the windshield and windows. Consumers can only clean these surfaces if they bring a rag or paper towel into the car with them. Even then it is difficult to reach all areas of the windshield without climbing and twisting into unusual positions. It is all too common that, even after the windshield is cleaned, a driver will notice streaks and smudges left behind, which is aggravated during nighttime driving and headlight glare.

U.S. Pat. No. 6,114,651 to Schluter et al discloses a laser beam apparatus for the removal of surface layers from work pieces.

WIPO PCT application WO 83/01400A1 to Wingrove discloses a non-contacting removal of undesired materials from the surfaces of objects by directing coherent electromagnet radiation from a laser onto the undesired material.

U.S. Pat. No. 5,151,134 to Boquillon et al discloses a process and device for cleaning pollutants from a surface using a laser for applying pulses to the surface to be cleaned.

United States Pat. App. No. 2006/0144834A1 to Denney et al discloses a containment plenum adapted to deliver laser light to an interaction region of a structure to remove material from the structure.

Japanese Pat. No. 2001-009399A2 to Ooshima discloses a cleaning apparatus to remove impurities fixed to the surface.

Japanese Pat. No. 2001-300749A2 to Iwasa et al discloses a method of laser beam machining and method of manufacturing work with a laser beam and method of cleaning.

Japanese Pat. No. 2000-202384A2 to Okada et al discloses an apparatus to simultaneously carry out the washing and inspection process in a semiconductor element fabrication process.

Japanese Pat. No. 2002177613A2 to Takeuchi et al disclose a game medium device and game medium cleaning method.

WIPO PCT application WO 2005/058514A1 to Thro discloses a surface cleaning method and device using a laser beam.

Japanese Pat. No. 2000-202385A2 to Narisawa discloses a cleaning of smooth surface by a laser beam.

U.S. Pat. No. 4,720,621 to Langen discloses a method and apparatus for removing impurities from metallic objects.

While these units may be suitable for the particular purpose employed, or for general use, they would not be as suitable for the purposes of the present invention as disclosed hereafter.

SUMMARY OF THE INVENTION

It is an object of the invention to produce a cleaning system for both sides of automobile windshields and windows that does not rely on the use of chemicals. Accordingly, the invention is a laser powered cleaning system and method of same which uses laser light to clean pollutants from automobile windows.

It is another object of the invention to provide a means for cleaning automobile windshields without leaving streaks.

It is another object of the invention to easily remove debris from both sides of a windshield by disintegrating, vaporizing and flaking it off.

It is another object of the invention to provide a method for selectively eradicating dirt and film from the surface of a windshield.

It is another object of the invention to provide a system that is conveniently powered through an automobile power source.

It is yet another object of the invention to provide a cleaning device that does not scratch the glass as it cleans.

It is yet another object of the invention to provide a safety means for turning the system off when all components are not functioning or if the interior block falls from the windshield.

It is yet another object of the invention to provide a cleaning system which is fixed within an automobile and integrated to work with a windshield of an automobile.

It is yet another object of the invention to provide a cleaning system which is fixed within the door of an automobile and integrated to clean the window when it is rolled up or down.

This invention is a laser powered cleaning system for cleaning pollutants and debris from automobile windshields and windows. The system includes an electromagnetic interior block having a top surface having a plurality of focused laser beams, and a magnetic exterior block having a top surface including a reflective surface. The windshield or window is situated between the interior and exterior blocks which pass over the window for cleaning. A power cord connected to an adapter plugs into an automobile power outlet for supplying power. A safety sensor is integrally coupled to the interior block for actuating the system when safe. The system is fixable onto a windshield or window within a door of an automobile. An on-off switch actuates the fixed system.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

The invention is a laser powered cleaning system 10 and method of same for cleaning pollutants from automobile windows. In its broadest context, the system 10 is either a portable system 10A or a fixed system 10B. The portable system 10A is selectively used to clean a windshield or window surface. The fixed system 10B is integrated into different windshields and windows.

Figure 1:
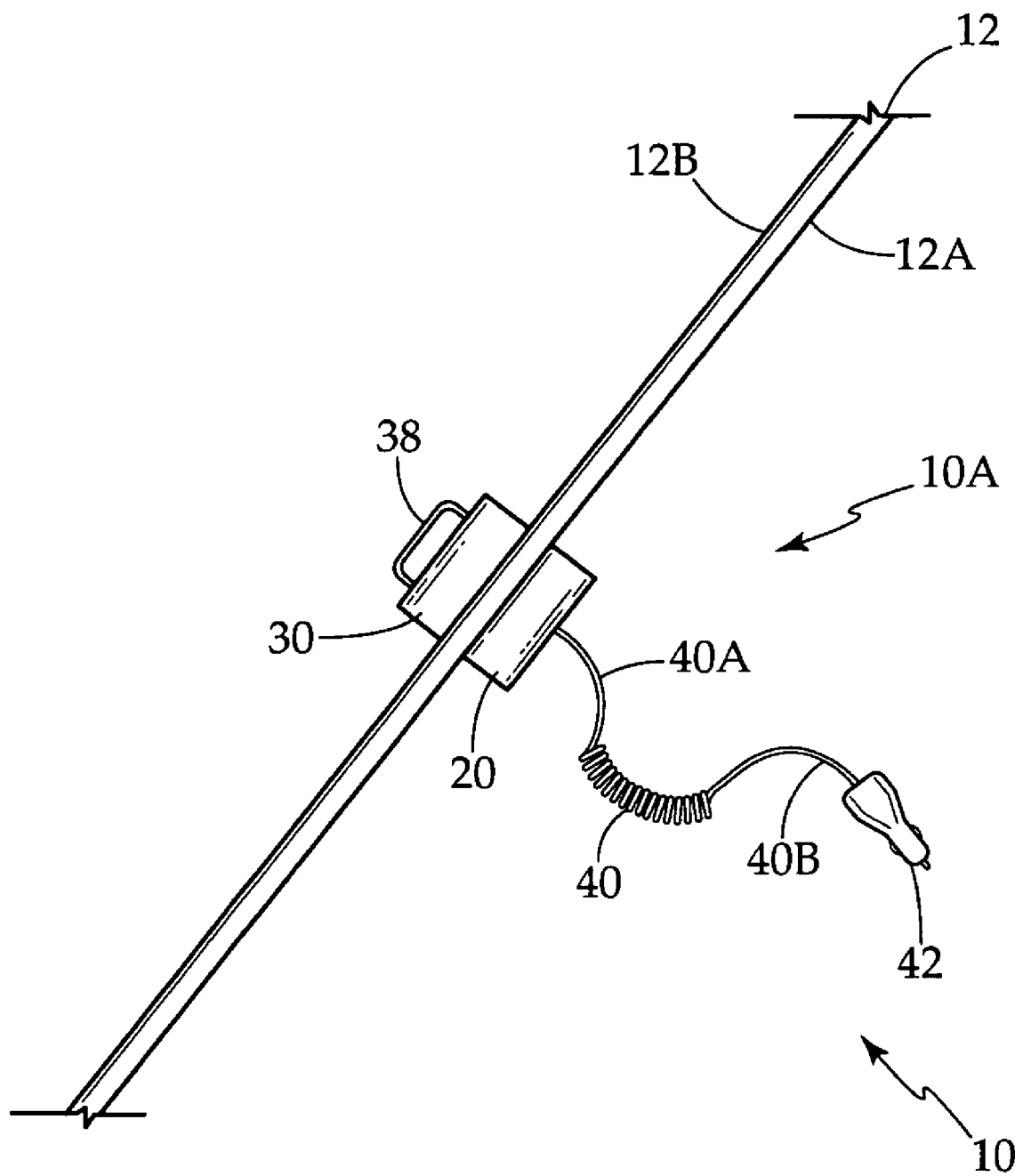
FIG. 1 is a diagrammatic perspective view of a laser powered cleaning system of the first embodiment, wherein the system is portable and includes an electromagnetic interior block and a magnetic exterior block.
Figure 2:
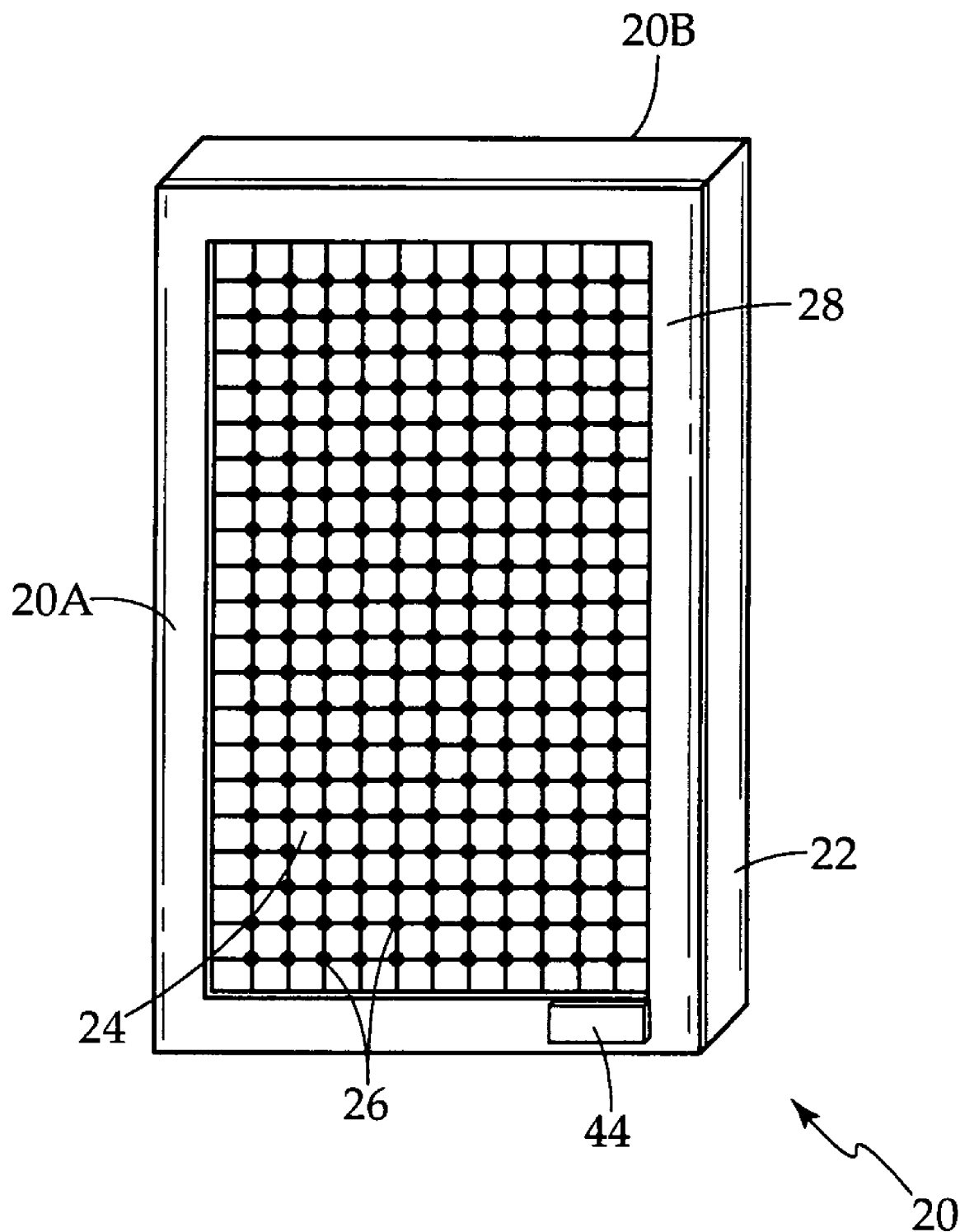
FIG. 2 is a diagrammatic perspective view of the electromagnetic interior block of the laser powered cleaning system of the first embodiment.
Figure 3:
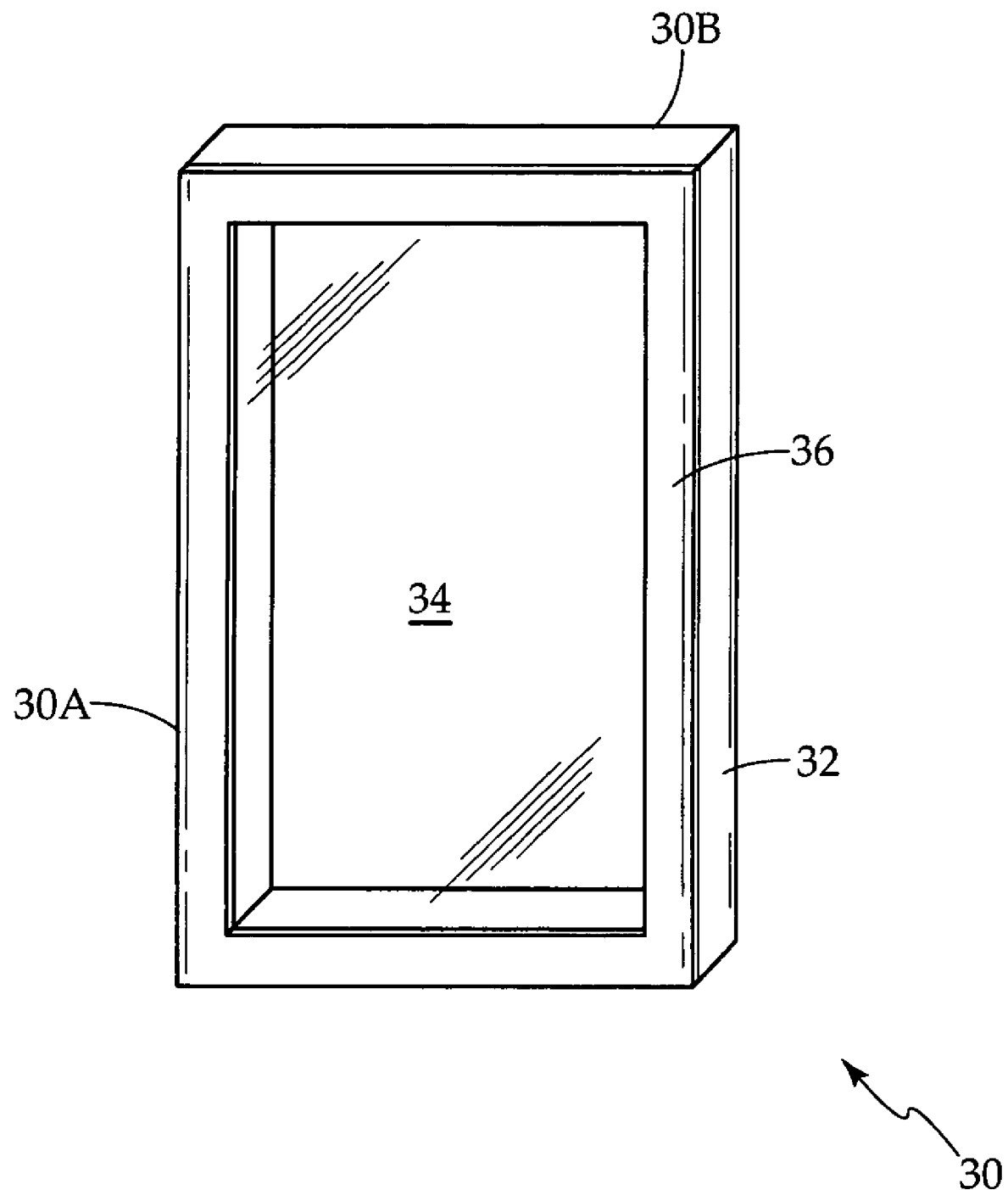
FIG. 3 is a diagrammatic perspective view of the magnetic exterior block of the laser powered cleaning system of the first embodiment.

The portable system 10A is the first embodiment and is illustrated in FIGS. 1-3. Particularly, FIG. 1 illustrates the system 10A coupled to a windshield 12. The windshield 12 has an interior surface 12A and an exterior surface 12B. This portable system 10A is removable from the automobile and can be selectively coupled to any window or windshield 12. The system 10A includes an interior block 20 and an exterior block 30. Both the interior and exterior blocks 20 and 30 are substantially rectangular magnetic blocks similar in shape. Preferably, the blocks are four inches in length, by two inches in width, by one-quarter to one-half inches in thickness. Preferably, the interior block 20 is thinner than the exterior block 30.

The interior block 20 illustrated in FIG. 2 is an electromagnet housed within a rubber shell 22. The electromagnet interior block 20 reduces the weight of the block thereby preventing the block 20 from falling off the windshield 12 when in use. The interior block 20 includes a top surface 20A and a bottom surface 20B. The top surface 20A includes a substantially rectangular laser array 24. The laser array 24 includes a plurality of focused laser beams 26 organized into a grid fashion. A felt padding perimeter 28 trims the laser array 24 and prevents the glass window or windshield 12 from being scratched during cleaning. Referring to FIG. 1, a power cord 40 is integrally coupled at the first end 40A to the bottom surface 20B of the interior block 20 and supplies power to the laser array 24. The second end 40B of the power cord is preferably integrally coupled to adapter 42, preferably a 6 or 12-volt adapter, which plugs into the power outlet of the automobile. Alternative power supplies are contemplated. Preferably, the top surface 20A of the interior block 20 is placed against the interior surface 12A of the windshield 12.

FIG. 3 illustrates the exterior block 30, which is a standard magnet block housed within a rubber shell 32. The exterior block 30 includes a top surface 30A and a bottom surface 30B. The top surface 30A includes a substantially rectangular reflective surface 34. A felt padding perimeter 36 trims the reflective surface 34 and prevents the glass window or windshield 12 from being scratched during cleaning. The bottom surface 20B includes a handle 38 coupled thereto (shown in FIG. 1). Preferably, the top surface 30A of the exterior block 30 is placed adjacent the exterior surface 12B of the windshield 12.

Additionally referring to FIG. 2, a safety sensor 44 is integrally coupled to the electromagnet interior block 20 in communication with the laser array 24 and the magnetic exterior block 30. The safety sensor 44 actuates the laser array 24 when both power is supplied through the adapter and the both the electromagnetic interior block 20 and magnetic exterior block 30 are in communication. Therefore, if the interior block 20 falls off the windshield 12 or the exterior block 30 is not yet positioned in direct correspondence with the interior block 20, the laser array 24 automatically remains turned off. Not until the interior and exterior blocks 20 and 30 are functioning together and the power is supplied, can the laser array 24 be actuated and turned on.

As shown in FIG. 1, in use, the interior surfaces 20A and 20B of the interior and exterior blocks 20 and 30, respectively, couple or face one another with the windshield 12 sandwiched therebetween. The adapter 42 is plugged into the car adapter and power is supplied to the interior block 20. The safety sensor 44 then checks the power and the magnetic communication between the interior and exterior blocks 20 and 30 before actuating the focused laser beams 26 of the laser array 24 to commence cleaning the windshield 12. The user grasps the handle 38 of the exterior block 30 and slides it across the exterior 12B of the windshield 12. This causes the interior block 20 to mimic movement of the exterior block 30 by means of magnetism, thereby causing the interior block 20 to correspondingly move across the interior 12A of the windshield 12. This allows the laser array 24 and specifically the focused laser beams 26 to project upon the interior surface 12A, cleaning the interior surface 12A before, traveling through the interior surface 12A and making contact with the reflective surface 34 of the exterior block 30 and bouncing therefrom to the exterior surface 12B of the windshield 12, and cleaning said exterior surface 12B. The focused laser beams 26 cause any foreign material on the interior 12A and exterior surfaces 12B of the windshield 12 to disintegrate, vaporize and flake off.

The second embodiment of the present invention relates to the fixed system 10B which integrated into to different windshields and windows. The fixed system 10B has the same components as the portable system 10A with the addition of structural components that adapt the system 10A permanently to windshields and windows of an automobile, actuated by a motor. Therefore, there are two main types of fixed systems 10B, one for integration with a windshield 12, namely a fixed windshield system 11A, and one for integration with a window of an automobile, namely a fixed window system 11B.

Figure 4:
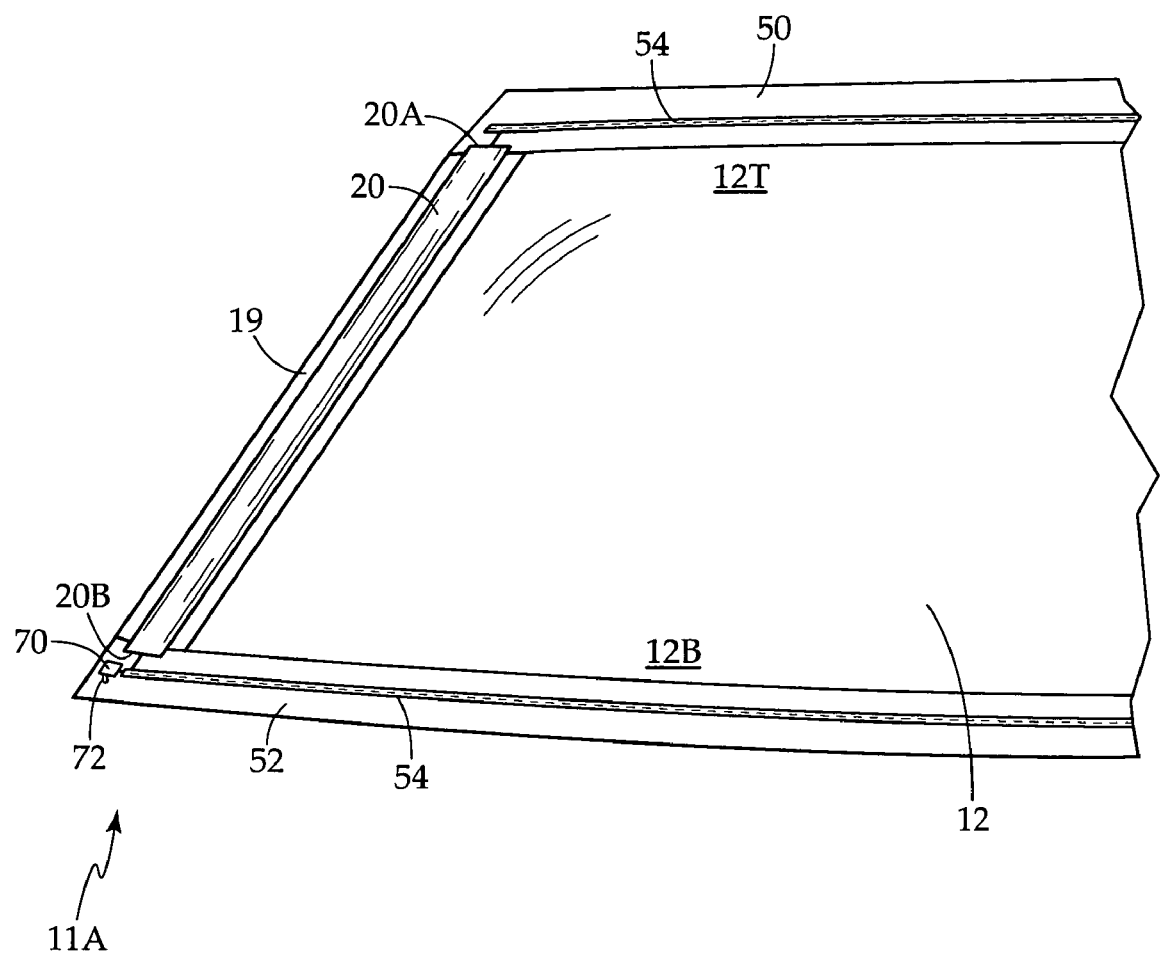
FIG. 4 is a diagrammatic perspective view of the laser powered cleaning system of the second embodiment which is fixed to a front windshield within an automobile.
Figure 5:
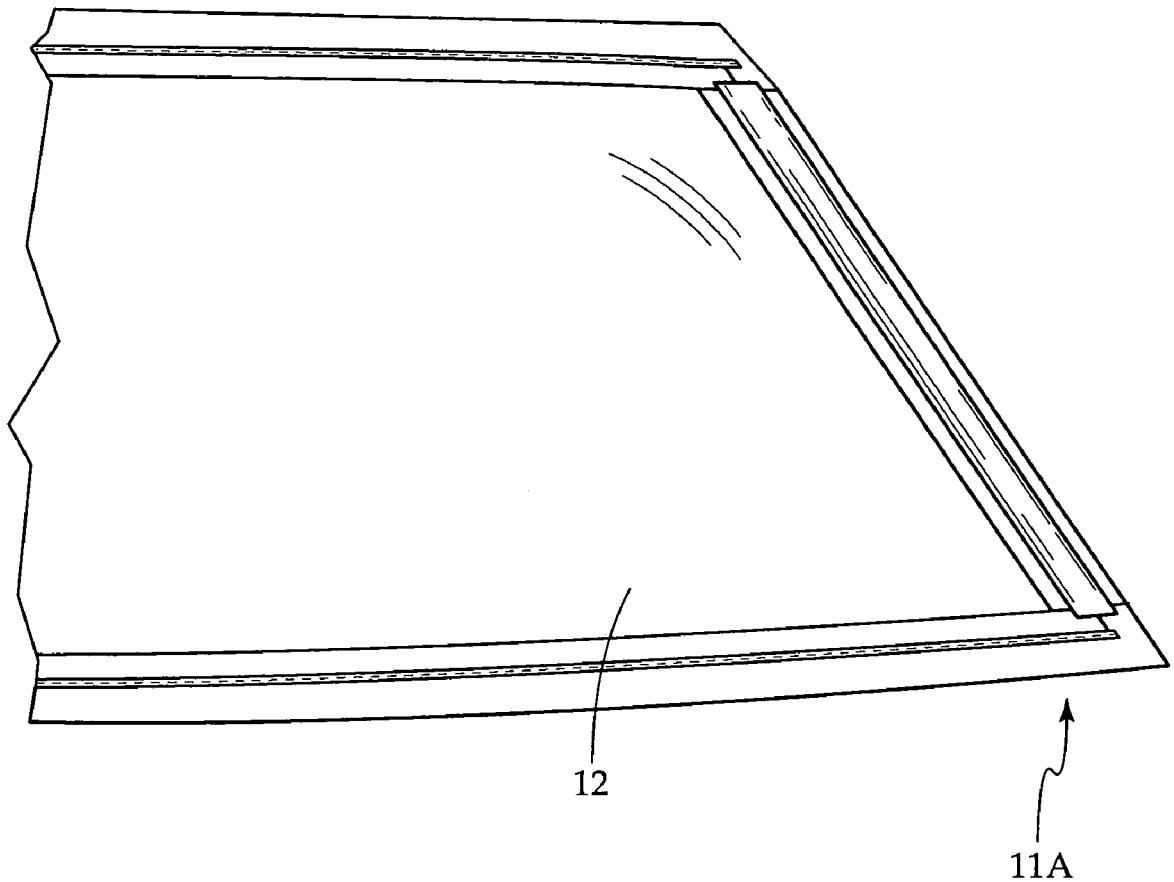
FIG. 5 is a diagrammatic perspective view of the laser powered cleaning system of the second embodiment which is fixed to a rear windshield within an automobile.
Figure 6:
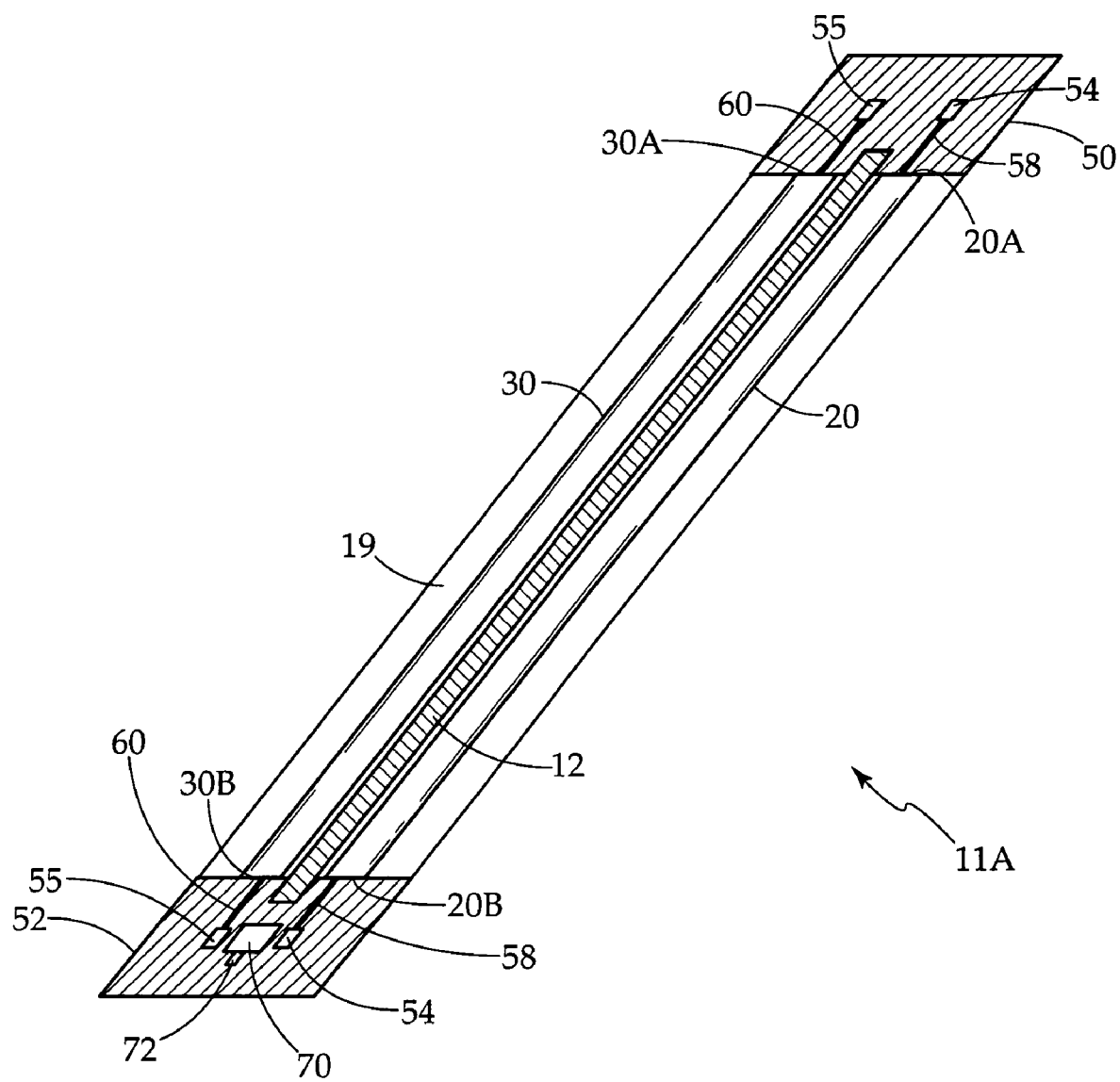
FIG. 6 is a cross-sectional view of the laser powered cleaning system of the second embodiment, wherein the interior and exterior blocks are shown held in position by masts and moveable by tracks during use.

FIGS. 4-6 illustrate the fixed windshield system 11A. Here the interior block and exterior block 20 and 30 respectively, are substantially elongated and rectangular in shape for substantially covering the entire height of the windshield 12. FIG. 4 illustrates the system 11A on a front windshield 12, while FIG. 5 illustrates the system integrated into the rear windshield 12.

The windshield 12 has a top end 12T and a bottom end 12B. The system 11A includes a top mast 50 and a bottom mast 52, which are horizontal housings which hold the top end 12T and bottom end 12B of the windshield 12 respectively. In addition, the windshield is held in vertical position on both ends by a pair of windshield supports 19. The top mast and bottom masts 50 and 52 each include an interior track 54 and an exterior track 55. The top surface 20A and the bottom surface 20B of the interior block 20 each include one first bracket 58 which extends along a similar plane and outwardly therefrom. Similarly, top surface 30A and the bottom surface 30B of the exterior block 30 each include one second bracket 60 which extends along a similar plane and outwardly therefrom. The two first brackets 58 of the interior block 20 are accepted into the interior tracks 54 of the top and bottom mast 50 and 52. Specifically, the first bracket 58 of the top surface 20A of the interior block 20 is accepted into the interior track 54 of the top mast 50. The first bracket 56 of the bottom surface 20B of the interior block 20 is accepted into the interior track 54 of the bottom mast 52. Similarly, the two second brackets 60 of the exterior block 30 are accepted into the exterior tracks 55 of the top and bottom mast 50 and 52. Specifically, the second bracket 60 of the top surface 30A of the exterior block 30 is accepted into the exterior track 55 of the top mast 50. The second bracket 60 of the bottom surface 30B of the exterior block 30 is accepted into the exterior track 55 of the bottom mast 52.

An electric motor 70 is in communication with an on-off switch 72. The user presses the on-off switch 72 which thereby actuates the first and second brackets 58 and 60 to move along the interior and exterior tracks 54 and 55, allowing the system 11A to slide along the tracks 54 and 56 and pass over the windshield surfaces 12A and 12B.

In addition, two on-off switches 72 are contemplated such that the interior block 20 can be activated independently from the exterior block 30 and vice versa.

Further, the interior and exterior blocks 20 and 30 would be stored within the windshield supports 19 in order to shield them from visibility and distraction while not in use.

FIG. 6 illustrates the cross-sectional view of the fixed windshield system 11A, wherein the interior and exterior blocks 20 and 30 are shown held in position by masts and moveable by tracks during use. Specifically, the windshield 12 is coupled between the interior block 20 and the exterior block 30 and held in position by the top and bottom masts 50 and 52.

Figure 7:
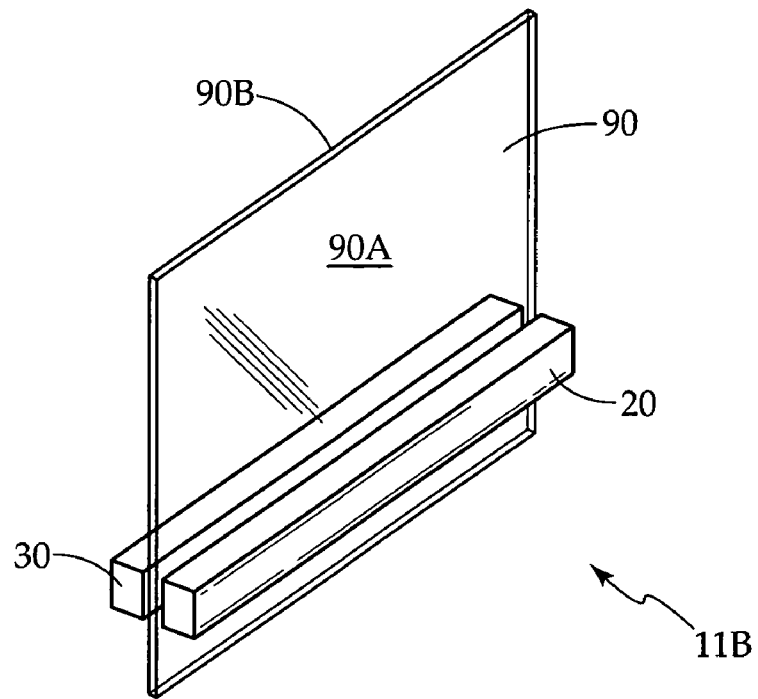
FIG. 7 is a diagrammatic perspective view of the laser powered cleaning system of the second embodiment in use cleaning a window, wherein the window is sandwiched between the interior and exterior blocks for cleaning.
Figure 8:
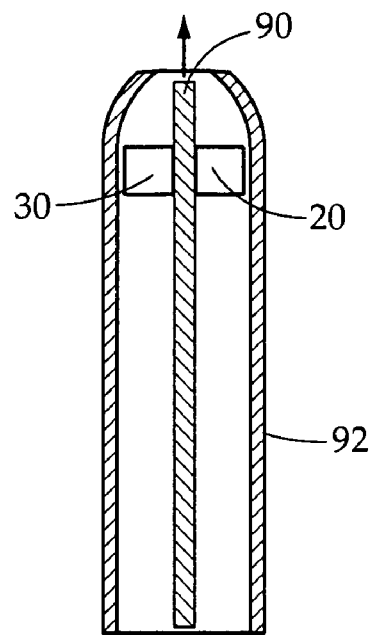
FIG. 8 is a cross-sectional view of the laser powered cleaning system of the second embodiment in use cleaning a window, wherein the interior and exterior blocks are housed within a door of an automobile.

FIGS. 7-8 illustrate the fixed window system 11B of the second embodiment of the present invention. Here, instead of a windshield, the system 11B is integrated to a window 90, having an interior and exterior surface 90A and 90B respectively. Similar to FIGS. 4-6, here the interior and exterior blocks 20 and 30 are substantially elongated and rectangular in length for covering the entire width of a window 90. The interior block for cleaning the interior surface 90A of the window 90 and the exterior block 30 for cleaning the exterior surface 90B of the window 90. Preferably, the interior and exterior blocks 20 and 30 are parallel to one another and integrally coupled within a door 92 of an automobile, such that when the window 90 is rolled up or down, either manually or automatically, the window 90 passes through the interior and exterior blocks 20 and 30 for cleaning.

The second and third embodiments of the present invention relating to the fixed system 10B, including a fixed windshield system 11A and a fixed window system 11B, clean both the outside and inside of a windshield and window respectively by allowing the laser array 24 and specifically the focused laser beams 26 to project upon the interior surface 12A, cleaning the interior surface 12A before traveling through the interior surface 12A, and making contact with the reflective surface 24 of the exterior block 30 and bouncing therefrom to the exterior surface 12B of the windshield 12 and window 90 and cleaning said exterior surface 12B.

In conclusion, herein is presented a laser powered cleaning system and method of same for cleaning pollutants from automobile windows. The invention is illustrated by example in the drawing figures, and throughout the written description. It should be understood that numerous variations are possible, while adhering to the inventive concept. Such variations are contemplated as being a part of the present invention.

What is claimed is:

1. A portable laser powered cleaning system for cleaning pollutants and debris from both sides of automobile windshields, comprising:
    a windshield having an interior surface and an exterior surface;
    a substantially rectangular electromagnetic interior block housed within a rubber shell, having a top surface and a bottom surface, said top surface including a substantially rectangular laser array having a plurality of focused laser beams organized into a grid, said top surface of said interior block having a felt padding perimeter trimming said laser array, wherein said top surface of said interior block is positionable adjacent said interior surface of said windshield;
    a substantially rectangular magnetic exterior block housed within a rubber shell, having a top and bottom surface, said top surface including a substantially rectangular reflective surface, said top surface of said exterior block having a felt padding perimeter trimming said reflective surface, said bottom surface of said exterior block having a handle integrally coupled thereto, wherein said top surface of said exterior block is positionable adjacent said exterior surface of said windshield;
    a power cord, having a first and second end, wherein said first end integrally coupled to said bottom surface of said interior block for supplying power to said laser array;
    an adapter integrally coupled to said second end of said power cord for plugging into a power outlet of an automobile; and
    a safety sensor integrally coupled to said electromagnet interior block in communication with said laser array and said exterior block for actuating said laser array when both power is supplied through said adapter and both said interior block said exterior block are in communication.

2. A laser powered cleaning system for cleaning pollutants and debris from both sides of an automobile windshield, comprising:
    a windshield having an interior surface, an exterior surface, a top end, and a bottom end;
    a substantially elongated rectangular exterior block housed within a rubber shell, having a top surface and a bottom surface, said top surface including a substantially rectangular laser array having a plurality of focused laser beams organized into a grid, said top surface of said interior block having a felt padding perimeter trimming said laser array, wherein said top surface of said interior block is positionable adjacent said interior surface of said windshield;
    a substantially elongated rectangular exterior block housed within a rubber shell, having a top and bottom surface, said top surface including a substantially rectangular reflective surface, said top surface of said exterior block having a felt, padding perimeter trimming said reflective surface, wherein said top surface of said exterior block is positionable adjacent said exterior surface of said windshield;
    a top and bottom mast for horizontally housing said top end and said bottom end of said windshield therebetween, and a pair of windshield supports for holding the windshield vertically therebetween, said top and bottom mast each include an interior track and an exterior track, said top and bottom surface of said interior block each including one first bracket extending along a similar plane and outwardly therefrom, said top and bottom surface of said exterior block each including one second bracket extending along a similar plane and outwardly therefrom, said two first brackets of said interior block are accepted into said interior tracks of said top and bottom mast, and said two second brackets of said exterior block are accepted into said exterior tracks of said top and bottom mast;

an electric motor in communication with an on-off switch for actuating said first and seconds brackets to ride along said interior and exterior tracks allowing said system to pass along said interior surface and exterior surface of said windshield;

a power cord, having a first and second end, wherein said first end integrally couples to said electric motor; and an adapter integrally coupled to said second end of said cower cord for plugging into a power outlet of an automobile.

3. The laser powered cleaning system of claim 2, wherein, said first bracket of said top surface of said interior block is accepted into said interior track of said top mast, and said first bracket of said bottom surface of said interior block is accepted into said interior track of said bottom mast.

4. The laser powered cleaning system of claim 3, wherein said second bracket of said top surface of said exterior block is accepted into said exterior track of said top mast, and said second bracket of said bottom surface of said exterior block is accepted into said exterior track of said bottom mast.

5. The laser powered cleaning system of claim 2, further comprising two on-off switches which independently activate said interior and said exterior blocks.

* * * * *